(12) United States Patent
Croutwater et al.

(10) Patent No.: US 10,198,501 B2
(45) Date of Patent: Feb. 5, 2019

(54) OPTIMIZING RETRIEVAL OF DATA RELATED TO TEMPORAL BASED QUERIES

(71) Applicant: International Business Machines Corporation, Armonk, NY (US)

(72) Inventors: Kyle L. Croutwater, Chapel Hill, NC (US); Vikrant Verma, Cary, NC (US); Le Zhang, Durham, NC (US); Zhe Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/278,151

(22) Filed: Sep. 28, 2016

(65) Prior Publication Data

US 2018/0089305 A1  Mar. 29, 2018

(51) Int. Cl.
*G06F 17/30* (2006.01)
*G06F 17/27* (2006.01)

(52) U.S. Cl.
CPC .... *G06F 17/30654* (2013.01); *G06F 17/2785* (2013.01); *G06F 17/30663* (2013.01)

(58) Field of Classification Search
None
See application file for complete search history.

(56) References Cited

U.S. PATENT DOCUMENTS

| | | | |
|---|---|---|---|
| 9,110,944 B2 | 8/2015 | Brown et al. | |
| 10,031,953 B1* | 7/2018 | Sahin | G06F 17/30551 |
| 2010/0299139 A1* | 11/2010 | Ferrucci | G06F 17/30654 |
| | | | 704/9 |
| 2014/0280114 A1* | 9/2014 | Keysar | G06F 17/30864 |
| | | | 707/730 |
| 2015/0293901 A1 | 10/2015 | Bufe, III et al. | |
| 2015/0356170 A1 | 12/2015 | Allen et al. | |
| 2016/0012335 A1 | 1/2016 | Bufe, III et al. | |
| 2016/0133146 A1* | 5/2016 | Bak | G09B 7/00 |
| | | | 434/322 |
| 2017/0193088 A1* | 7/2017 | Boguraev | G06F 17/30684 |
| 2017/0228372 A1* | 8/2017 | Moreno | G06F 17/30654 |

OTHER PUBLICATIONS

List of IBM Patent Applications to Be Treated as Related. Filed Sep. 28, 2016.

(Continued)

*Primary Examiner* — Christopher J Raab
(74) *Attorney, Agent, or Firm* — Law Office of Jim Boice

(57) ABSTRACT

A computer-implemented method generates a candidate answer triple for use in retrieving information used to answer a question. One or more processors parse a question to identify a lexical answer type for the question, a question action for the question, and a question timestamp for the question to make up a question triple. One or more processors retrieve multiple candidate passages for answering the question, and parse each of the multiple candidate passages to identify a candidate entity, a candidate action, and a candidate timestamp from each of the multiple candidate passages to generate a candidate answer triple. One or more processors compare the question triple to the candidate answer triple and establish a match score for each candidate answer triple, which is used in retrieving information used to answer the question.

20 Claims, 10 Drawing Sheets

(56) References Cited

OTHER PUBLICATIONS

P. Mell et al., "The NIST Definition of Cloud Computing", National Institute of Standards and Technology, Information Technology Laboratory, Sep. 2011, pp. 1-7.
M. Vicente-Diez et al., "Are Passages Enough? The Miracle Team Participation in QA@CLEF2009", Springer, Multilingual Information Access Evaluation, Lecture Notes in Computer Science 6241, 2010, pp. 281-288.
IBM, "A System & Method to Identify Correct Candidates for Question Answering Over Structured Knowledge", IP.COM, IPCOM000180748D, Mar. 16, 2009, pp. 1-4.
K. Zhou et al, "Collecting and Ranking Questions Before a Meeting Starts", IP.COM, IPCOM000227828D, May 20, 2013, pp. 1-7.
Anonymous, "Technique for Predictive Analysis and Subsequent Ranking of Candidates for Online Social Q&A Interaction", IP.COM, IPCOM000233143D, Nov. 25, 2013, pp. 1-5.

\* cited by examiner

OPTIMIZING RETRIEVAL OF DATA RELATED TO TEMPORAL BASED QUERIES

BACKGROUND

The present invention relates to the field of computers, and particularly to computers used in artificial intelligence. Still more particularly, the present invention relates to computers equipped with artificial intelligence retrieving information used to answer a question.

SUMMARY

A computer-implemented method generates a candidate answer triple for use in retrieving information used to answer a question. One or more processors parse a question to identify a lexical answer type for the question, a question action for the question, and a question timestamp for the question. The lexical answer type indicates what entity type is being asked for by the question, the question action describes an action referenced in the question that was performed by an entity of the entity type, and the question timestamp defines a time range during which the action referenced in the question was performed by the entity. Together, the lexical answer type, the question action, and the question timestamp make up a question triple. One or more processors retrieve multiple candidate passages for answering the question, and parse each of the multiple candidate passages to identify a candidate entity, a candidate action, and a candidate timestamp from each of the multiple candidate passages. One or more processors generate a candidate answer triple from the candidate entity, the candidate action, and the candidate timestamp identified from each of the multiple candidate passages. One or more processors compare the question triple to the candidate answer triple generated from each of the multiple candidate passages, such that the entity type in the question triple is compared to the candidate entity in the candidate answer triple, the question action in the question triple is compared to the candidate action in the candidate answer triple, and the question timestamp in the question triple is compared to the candidate timestamp in the candidate answer triple. One or more processors establish a match score for each candidate answer triple being compared to the question triple, where the match score is based on how closely the question triple matches a particular candidate answer triple. One or more processors tag the match score to each corresponding candidate answer triple generated from the multiple candidate passages. One or more processors associate the match score for each corresponding candidate answer triple with a corresponding candidate passage that generated the corresponding candidate answer triple for use in retrieving information used to answer the question.

The invention may also be implemented in a computer program product and/or a computer system.

DETAILED DESCRIPTION

Figure 1:
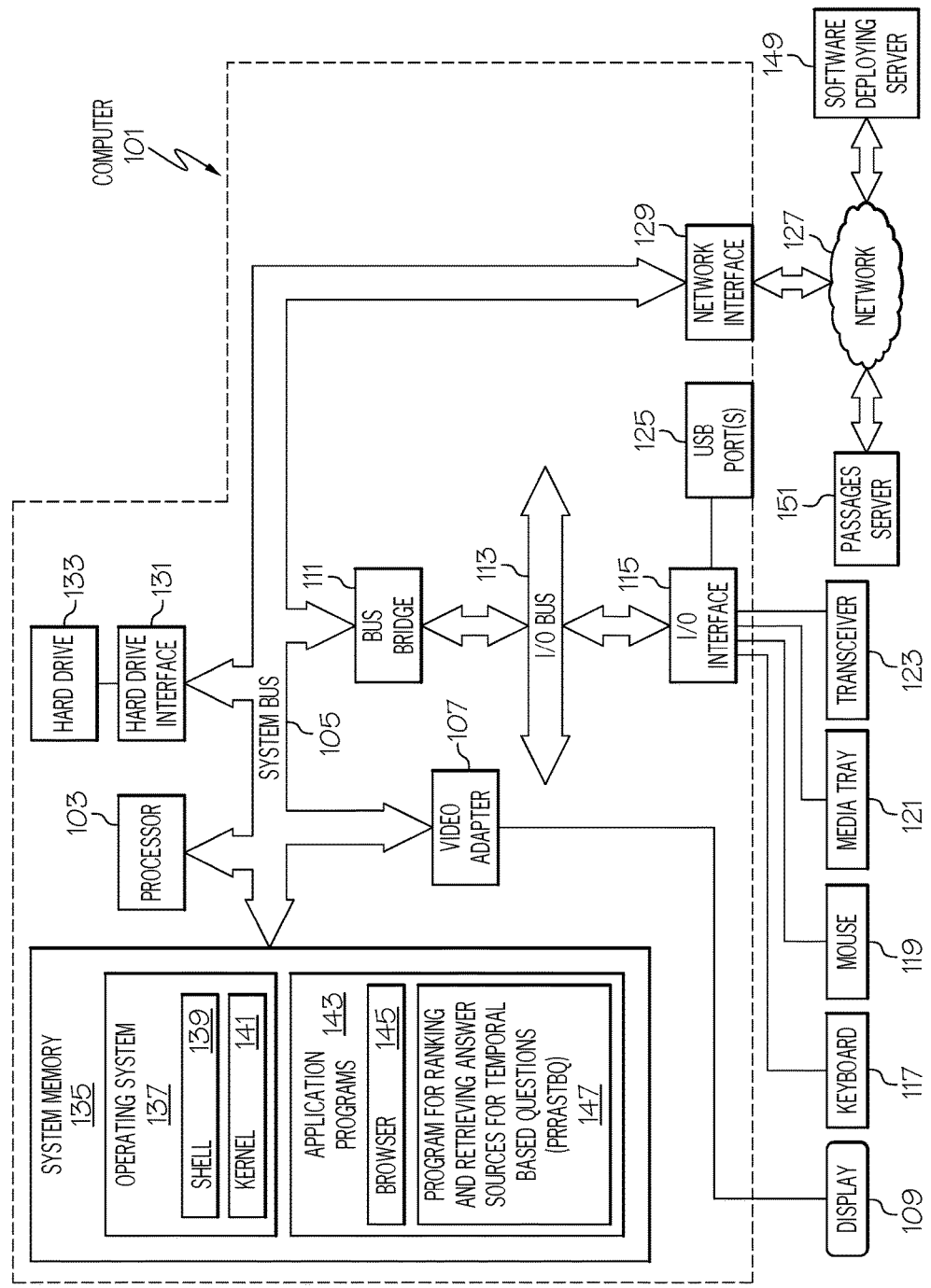
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or passages server 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

In an embodiment of the present invention, computer 101 is able to communicate via network 127 to the software deploying server 149 and/or the passage server 151.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system.

More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Program for Ranking and Retrieving Answers Sources for Temporal Based Questions (PRRASTBQ) 147. PRRASTBQ 147 includes code for implementing the processes described below, including those described in FIGS. 2-7. In one embodiment, computer 101 is able to download PRRASTBQ 147 from software deploying server 149, including in an on-demand basis, wherein the code in PRRASTBQ 147 is not downloaded until needed for execution. In one embodiment of the present invention, software deploying server 149 performs all of the functions associated with the present invention (including execution of PRRASTBQ 147), thus freeing computer 101 from having to use its own internal computing resources to execute PRRASTBQ 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, the present invention presents a method for optimizing answer rankings to temporal based questions by boosting a final answer with a strong signal (in the case of temporal based questions), so that the top answer will be correct. Specifically, the system creates a solution to enable an artificial intelligence system (and more specifically, a question answering computer system, e.g., IBM Watson™ QA system, capable of answering questions posed in natural language) with temporal awareness with respect to entities and events. The present invention provides a solution that includes two major parts: a temporal scorer and a temporal candidate generator. The temporal logic reasoning component described herein is shared by both the temporal scorer and the temporal candidate generator.

The temporal scorer improves the score and rank of correct temporal candidate answers to temporal questions. The temporal scorer provides a new temporal match feature, which can be used to determine the ranking of the potential candidate answer.

The temporal candidate generator extracts temporal candidate answers from passages.

The temporal scorer and/or temporal candidate generator thus provide an artificial intelligence machine with temporal awareness with respect to entities and events, so as to improve the artificial intelligence machine's ability to answer temporal based questions.

For example, consider temporal questions such as "Who was elected as the new president of Country X in March 2012?" (see FIG. 3 below); "Who was the president of the United States during World War II?"; "What was the treatment for hepatitis C in 1970?", "How long did Conflict X between Countries A and B last?" (see FIG. 5 below). All such questions are temporal (i.e., are asking about events during a certain time period).

Many prior art question-answer systems rely on existing ranking and scoring algorithms provided by the search engine to match text, stem words, synonyms, etc. However, such algorithms frequently rank passages that have indications of the correct time range lower than passages that are from incorrect time ranges. That is, such prior art systems often look for time cues within a passage without determining whether or not they are relevant to the question being asked. That is, a question may be "Where was Person X living after 2012?". One passage may state "Person X moved from New York in 2012" while another passage may state "Person X lived in Texas before 2013". Prior art systems are likely to rank the first passage higher than the second passage, since the first passage has "Person X" and "2012", while the second passage has "Person X" and "2013". In order to avoid such errors, the present invention presents a way to boost the final answer with a new feature with a strong signal in the case of temporal based questions so that the top answer will be correct.

As described herein, the present invention extracts a triple of entity (noun), action (verb), and timestamp and uses these as a basis in both a temporal candidate answer and temporal logical reasoning components. The temporal logical reasoning component in the present invention calculates a ranking score by comparing the logical distance (e.g., how closely aligned they are based on semantics and/or other contextual analytical processes) between the triple extracted in the question and the one extracted in each candidate answer. Based on this ranking score, one or more embodiments of the present invention then generate a candidate answer based on these triples.

Other prior art approaches rely heavily on a predefined and hard-coded temporal entity mapping list to associate temporal information with candidate answers. The coverage and quality of this list has a large impact on the capability of a computer (particularly a computer with question answering abilities) to detect and analyze temporal clues. That is, due to storage and performance constraints, it is impossible to build a mapping list that can cover all entities, especially for open domain settings. Furthermore, building and maintaining such a list may be so difficult that it requires further labor intensive post-processing.

Other prior art approaches use a set of temporal scorers to promote candidate answers highly related with temporal clues. These scorers first extract all of the explicit temporal expressions from a question. Then given predefined temporal entity mapping lists, they iterate through all of the terms in passages searching for matches. However, temporal expressions are often not associated with certain entities and actions in this approach. Thus, the same temporal expression may be mentioned with multiple entities or actions in one or more passages. Failing to consider the contextual information associated with temporal clues can result in an undesired outcome in which incorrect matches are promoted as highly ranked candidate answers.

Other prior art approaches extract candidate answers based on an explicit word-to-word matching mechanism. Candidate answer generators only select words or expressions explicitly mentioned in passages. However, for many temporal questions, it is fairly common that passages mention correct answers implicitly. Extracting these correct answers requires a certain level of reasoning. The existing mechanism limits a question answering system's capability of answering these questions.

Figure 2:
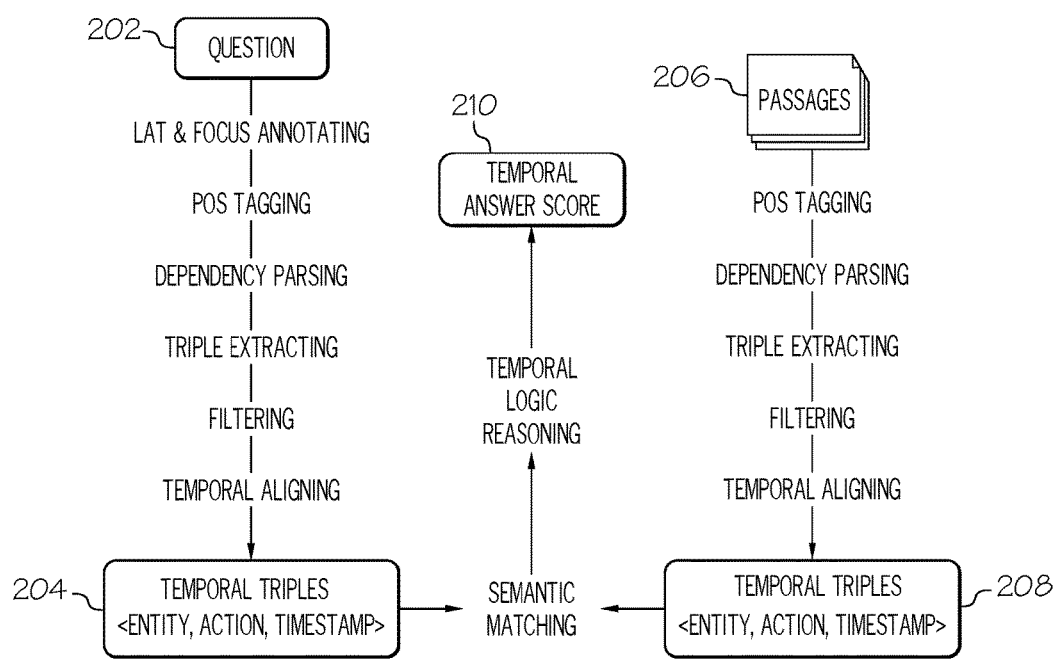
FIG. 2 illustrates an exemplary process for generating temporal answer scores based on comparisons of temporal triples from a question and multiple passages.

With reference now to FIG. 2, an exemplary process for generating temporal answer scores based on comparisons of temporal triples from a question and multiple passages is presented.

The system (e.g., computer 101 shown in FIG. 1) parses a question 202 to find the main focus and action in the question. That is, as shown in FIG. 2, the question is parsed to identify a lexical answer type (LAT) and focus of the question (e.g., "Who", "What", etc. the question is about) and what action is associated with the question. As shown, the question is further parsed to identify parts of speech (POS) of words in the question, to extract pairwise syntactic relation among any two words (dependency parsing), to filter out extraneous relations (e.g., prepositional modifier, etc.) and words (e.g., articles, etc.), to temporally align the extracted relations (i.e., identify the time period to which the extracted relations are related), thus creating temporal triples 204 for the question 202.

Similarly, multiple passages 206 (e.g., text passages) are POS tagged, dependency parsed, filtered, and temporally aligned in order to generate temporal triples 208 for the passages 206.

The temporal triples 204 for the question 202 are semantically matched to the temporal triples 208 for the passages 206, thus allowing temporal logic reasoning to generate a temporal answer score 210. That is, if the temporal triples 204 for the question 202 are close in meaning (semantically matched) to the temporal triples 208 for the passages 206, then the answer extracted from the passages 206 is given a high score, while temporal triples 208 for the passages 206 that are not close in meaning to the temporal triples 204 for the question 202 are given a relatively lower score.

As shown in FIG. 2, the temporal logic reasoning identifies time ranges found in both the question 202 and the passages 206, applies a modal logic (e.g., linear temporal logic), and then deems their level of match (and thus the temporal answer score 210) based on whether there is an approximate temporal match, a strong match, a weak match, etc. The level of match may be based on a semantic match (terms having the logical connection—i.e., share a same context), stem word match (terms coming from a same root word), synonym matching (terms having a same meaning), etc. This matching is thus specific for the data range portion in the temporal triples 204 and temporal triples 208. The score generated is thus proportional to the strength and quality of the match between the question 202 and the passages 206.

Figure 3:
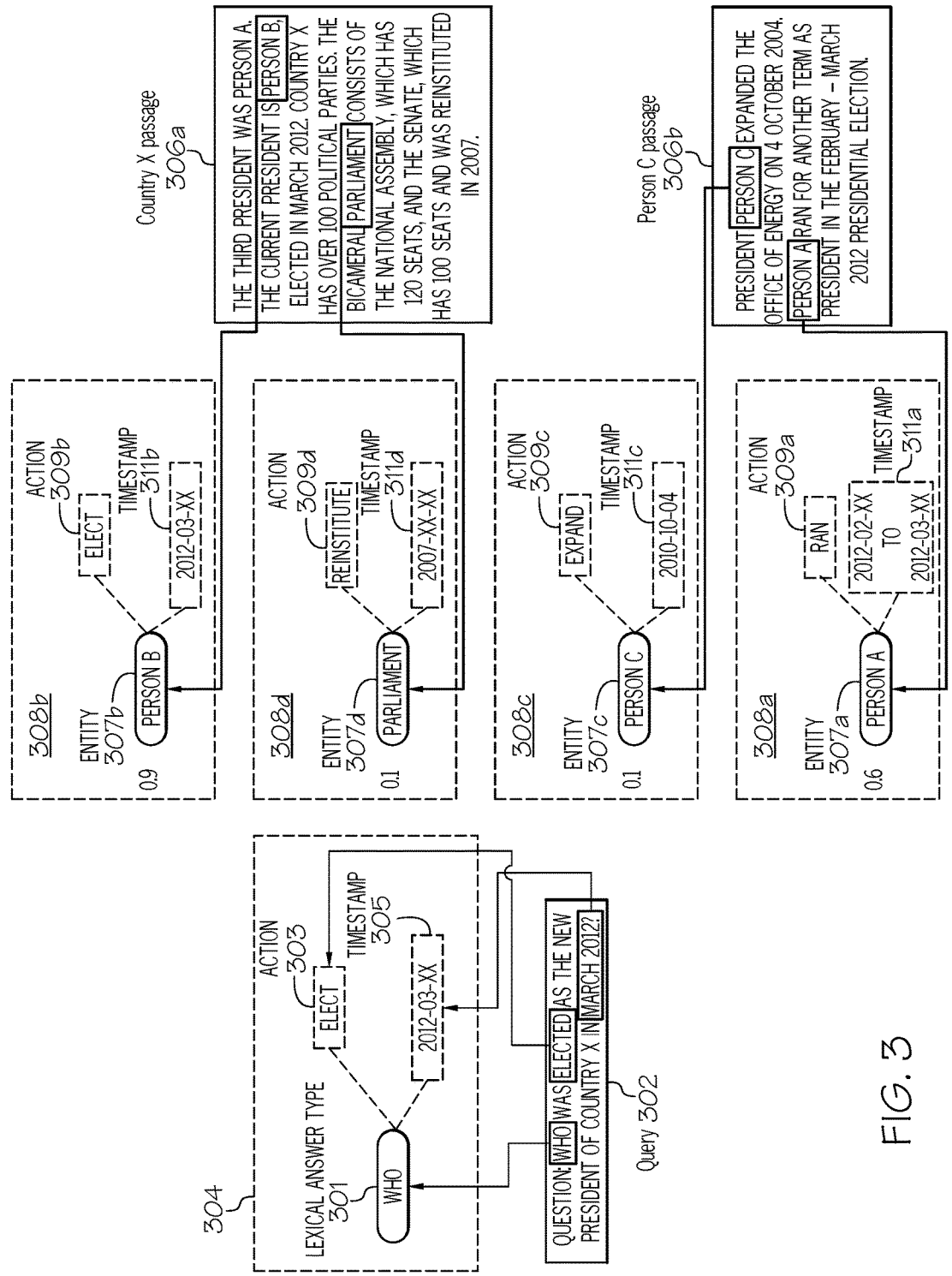
FIG. 3 depicts additional detail of the temporal triples discussed in FIG. 2.

With reference now to FIG. 3, additional exemplary detail of the temporal triples discussed in FIG. 2 is presented.

As shown in FIG. 3, query 302 (analogous to question 202 shown in FIG. 2) is parsed into a lexical answer type 301, an action 303, and a timestamp 305, thus creating a question temporal triple 304 (analogous to one of the temporal triples 204 depicted in FIG. 2)

As in FIG. 2, passage 306a is text information primarily about Country X, and is analogous to one of the passages 206 shown in FIG. 2. Similarly, passage 306b is text information primarily about Person C, and is also analogous to one of the passages 206 shown in FIG. 2. As shown in FIG. 3, passage 306a has been parsed to create multiple triples, shown as triple 308b and triple 308d (analogous to temporal triples 208 shown in FIG. 2). Similarly, passage 306b has also been parsed to create multiple triples, shown as triple 308c and triple 308a (also analogous to temporal triples 208 shown in FIG. 2).

Consider now triple 308b. As shown, entity 307b aligns with the lexical answer type 301 by addressing the question of "Who". Furthermore, the action 309b aligns with the action 303, and the timestamp 311b aligns with the timestamp 305. As such, triple 308b receives a high temporal answer score 210 (introduced in FIG. 2) of "0.9" out of 1.0.

However, consider now triple 308d. As shown, the action 309d does not align at all with the action 303, nor does the timestamp 311d aligns with the timestamp 305. Entity 307b does not clearly align with the lexical answer type 301, since "parliament" does not address the question of "Who". That is, in general usage, "parliament" is an organization, not a person. However, "parliament" might be considered an answer to "Who" when viewed as a collection of persons, so triple 308d receives a minimum temporal answer score of 0.1.

Consider now triple 308c. As shown, the action 309c does not align at all with the action 303, nor does timestamp 311c aligns with the timestamp 305. However, entity 307c does align with the lexical answer type 301, so triple 308c also receives a minimum temporal answer score of 0.1.

Consider now triple 308a. As shown, the action 309a does not exactly align with the action 303, but it does present a related term ("ran" to "elect"). Furthermore, entity 307a aligns exactly with lexical answer type 301, and timestamp 311a is a range that includes the specific date found in timestamp 305. Thus, due to these "close" matches, triple 308a receives a relatively high temporal answer score of 0.6.

Thus, the best candidate triple to use to obtain an answer for question 302 is triple 308b, followed by triple 308a.

Figure 4:
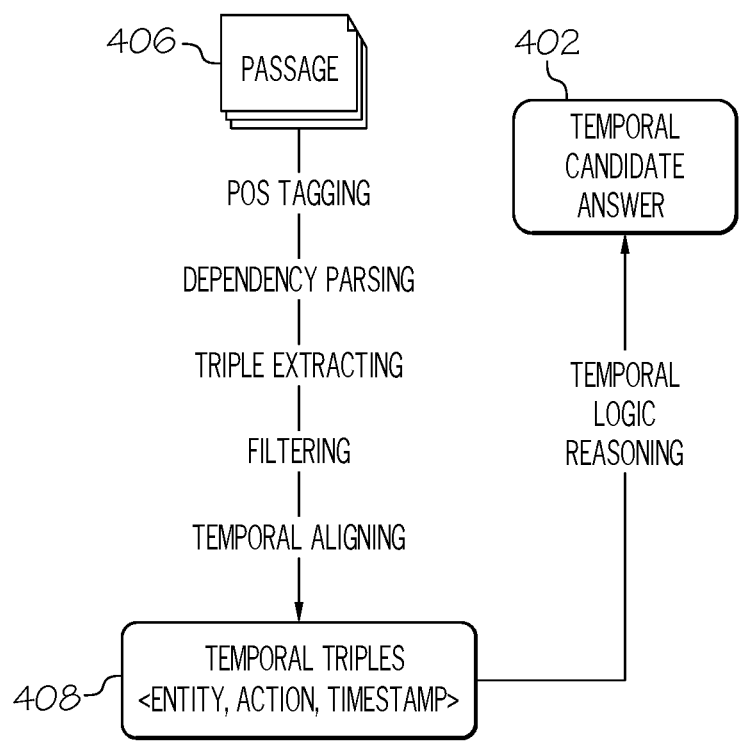
FIG. 4 illustrates an exemplary process for creating a temporal candidate answer to a question.

FIG. 4 illustrates an exemplary process for creating a temporal candidate answer to a question.

As shown in FIG. 4, for each temporal candidate answer 402 variant and corresponding passage returned in the search, the system will parse a passage 406 (analogous to one of the passages 202 shown in FIG. 2) into temporal triples 408 (analogous to temporal triples 208 shown in FIG. 2) to generate temporal candidate answer(s) 402 (which are scored by temporal answer score 210 shown in FIG. 2).

Figure 5:
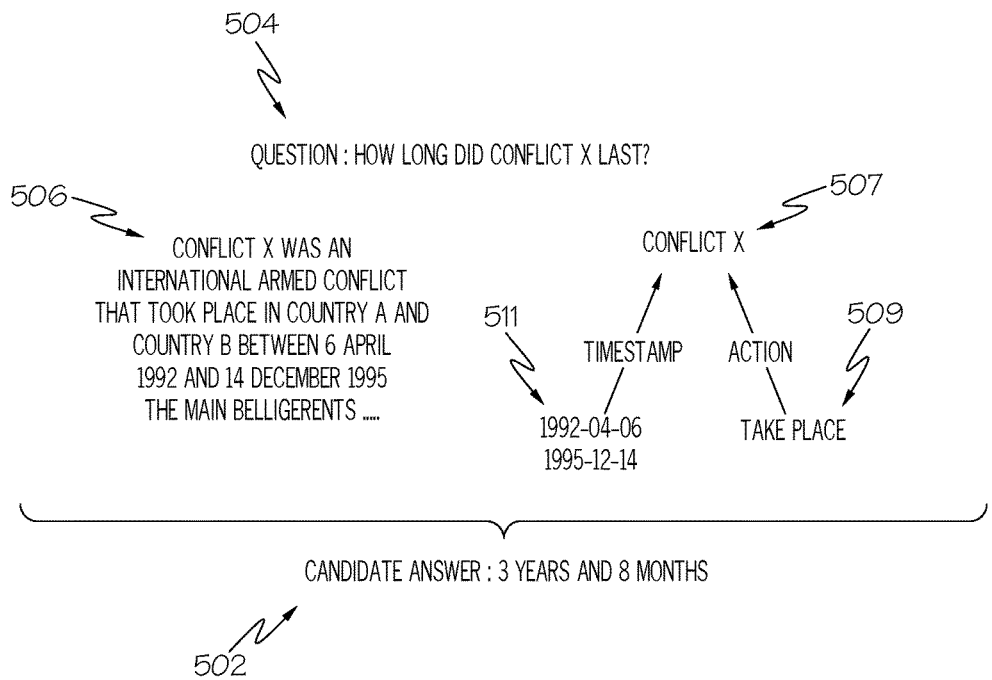
FIG. 5 depicts an exemplary answer to a temporal question as derived from a passage in accordance with one or more embodiments of the present invention.

For example, consider FIG. 5, which depicts an exemplary answer to a temporal question as derived from a passage in accordance with one or more embodiments of the present invention. As shown, the candidate answer 502 (analogous to temporal candidate answer 402 shown in FIG. 4) is derived from passage 506 (analogous to one of the passages 206 shown in FIG. 2), which was used to generate entity 507 (analogous to one of the entities 307a-307d shown in FIG. 3), action 509 (analogous to one of the actions 309a-309d shown in FIG. 3), timestamp 511 (analogous to one of the timestamps 311a-311d shown in FIG. 3), thus providing an answer to question 504 (analogous to query 302 shown in FIG. 3).

Thus, for all of the semantic triples extracted from passages, the present invention will: a) apply linear temporal logic to represent all of the semantic triples as facts; and b) give the semantic triples extracted from the question based on conducted logical reasoning.

Figure 6:
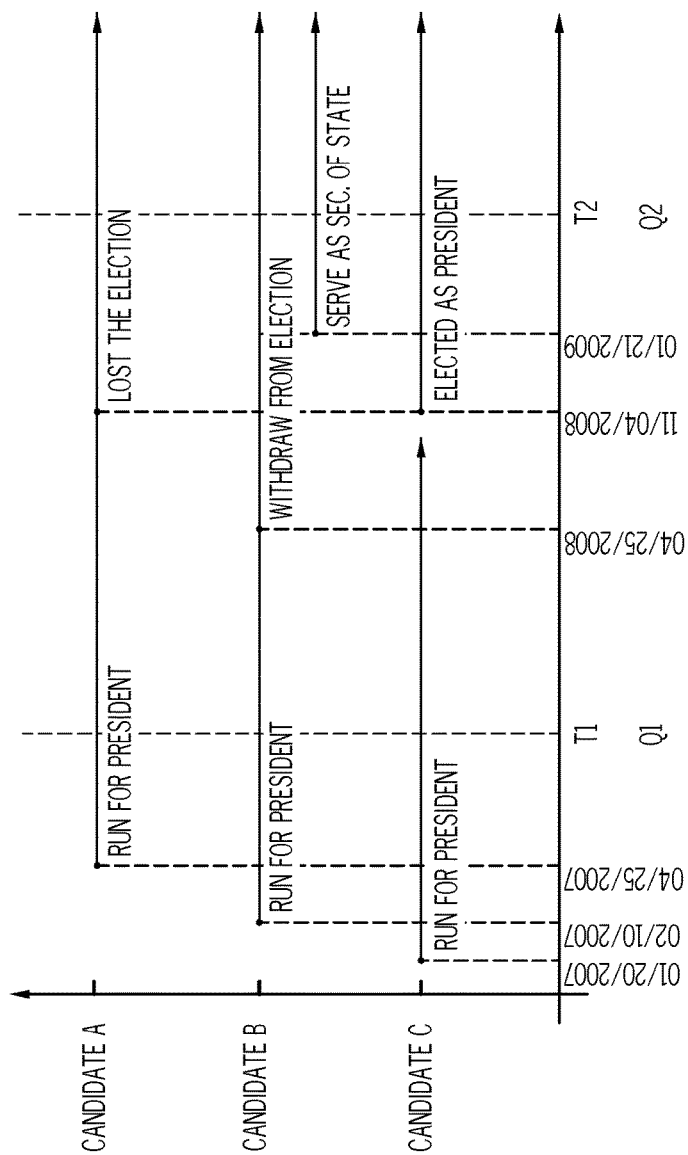
FIG. 6 depicts an exemplary use case in accordance with one or more embodiments of the present invention.

With reference now to FIG. 6, an exemplary use case illustrating the temporal logic reasoning process in accordance with one or more embodiments of the present invention is presented. As shown, the passages are represented as a time graph 600. The present invention will thus extract text (analogous to the entities 307a-307d shown in FIG. 3 as well as the actions 309a-309d shown in FIG. 3) found in the time graph 600, and then correlate that text with its placement on the time graph 600, in order to determine the timestamp (e.g., analogous to one or more of the timestamps 311a-311d shown in FIG. 3). Thus, the information in the time graph 600 provides answers A1-A2 to corresponding questions Q1-Q2, as shown in FIG. 6.

Figure 7:
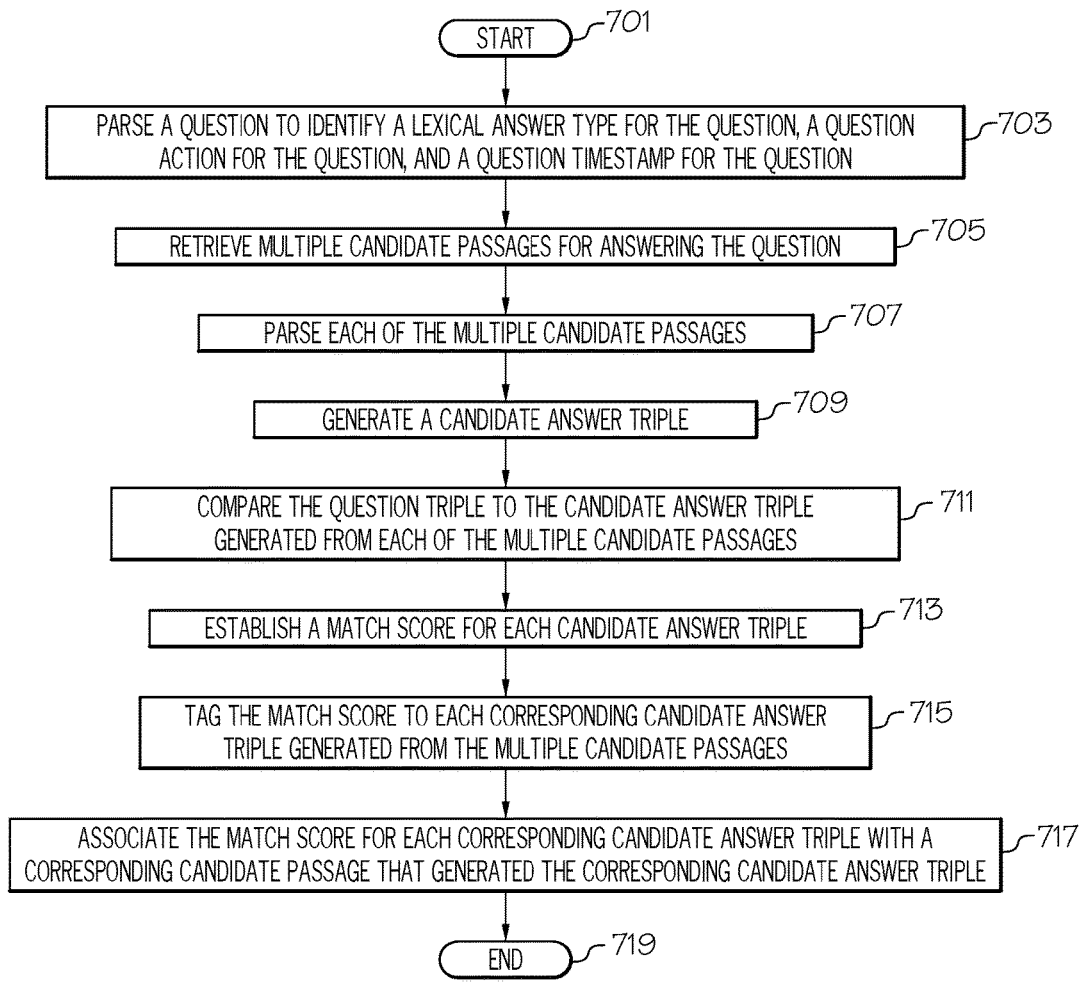
FIG. 7 is a high-level flow chart of one or more steps performed by one or more processors to optimize retrieval of data related to temporal based queries.

With reference now to FIG. 7, a high-level flow chart of one or more steps performed by one or more processors to optimize retrieval of data related to temporal based queries is presented.

After initiator block 701, one or more processors (e.g., processor 103 shown in FIG. 1) parse a question (e.g., query 302 shown in FIG. 3) to identify a lexical answer type (e.g., lexical answer type 301 shown in FIG. 3) for the question, a question action (e.g., action 303 shown in FIG. 3) for the question, and a question timestamp (e.g., timestamp 305 shown in FIG. 3) for the question, as depicted in block 703 of FIG. 7. As described herein, the lexical answer type indicates what entity type is being asked for by the question, the question action describes an action referenced in the question that was performed by an entity of the entity type, and the question timestamp defines a time range during which the action referenced in the question was performed by the entity. As described herein, the lexical answer type, the question action, and the question timestamp make up a question triple (e.g., one or more of the temporal triples 204 depicted in FIG. 2).

As described in block 705 of FIG. 7, one or more processors retrieve multiple candidate passages (e.g., passages 306a-306b shown in FIG. 3) for answering the question.

As described in block 707, one or more processors parse each of the multiple candidate passages to identify a candidate entity (e.g., entity 307b shown in FIG. 3), a candidate action (e.g., entity 309b shown in FIG. 3), and a candidate date/timestamp (e.g., timestamp 311b shown in FIG. 3) from each of the multiple candidate passages.

As described in block 709, one or more processors generate a candidate answer triple (e.g., one or more of the temporal triples 208 shown in FIG. 2) from the candidate entity, the candidate action, and the candidate date identified from each of the multiple candidate passages.

As described in block 711, one or more processors compare the question triple to the candidate answer triple generated from each of the multiple candidate passages. That is, the entity type in the question triple is compared to the candidate entity in the candidate answer triple, the question action in the question triple is compared to the candidate action in the candidate answer triple, and the question timestamp in the question triple is compared to the candidate date in the candidate answer triple.

As described in block 713, one or more processors establish a match score (e.g., temporal answer score 210 shown in FIG. 2) for each candidate answer triple being compared to the question triple, where the match score is based on how closely the question triple matches a particular candidate answer triple.

As described in block 715, one or more processors tag the match score to each corresponding candidate answer triple generated from the multiple candidate passages (e.g., using the value "0.9" as the match score tag for triple 308b shown in FIG. 3).

As described in block 717, one or more processors associate the match score for each corresponding candidate answer triple with a corresponding candidate passage that generated the corresponding candidate answer triple for use in retrieving information used to answer the question.

The flow-chart ends at terminator block 719.

In an embodiment of the present invention, the match score for each candidate answer triple is established by semantically matching each candidate answer triple to the question triple. That is, the match score is based on how closely they match under formal semantics (the logical meaning of the terms), lexical semantics (the meanings of the words), and/or conceptual semantics (the cognitive structure of the meaning of the words).

In an embodiment of the present invention, the match score for each candidate answer triple is established by stem word matching each candidate answer triple to the question triple. For example, "runner" and "running" would be related by their stem word "run", but "runner" and "rung" would not be related, since they do not share a same stem word (even though "runner" and "rung" both start with "run".

In an embodiment of the present invention, the match score for each candidate answer triple is established by synonym matching each candidate answer triple to the question triple. That is, if words in the question triple and the answer triple have a same meaning, then there is a near match, if not an exact match, between those words.

In an embodiment of the present invention, the lexical answer type defines an event that the question is asking about. Exemplary events include but are not limited to actions performed by persons, natural events such as weather events, etc., etc.

In an embodiment of the present invention, the lexical answer type defines a person that the question is asking about. That is, the person may be identified as a sports figure, a politician, etc.

In an embodiment of the present invention, the lexical answer type defines a place (e.g., locale, city, state, country, etc.) that the question is asking about.

Figure 8:
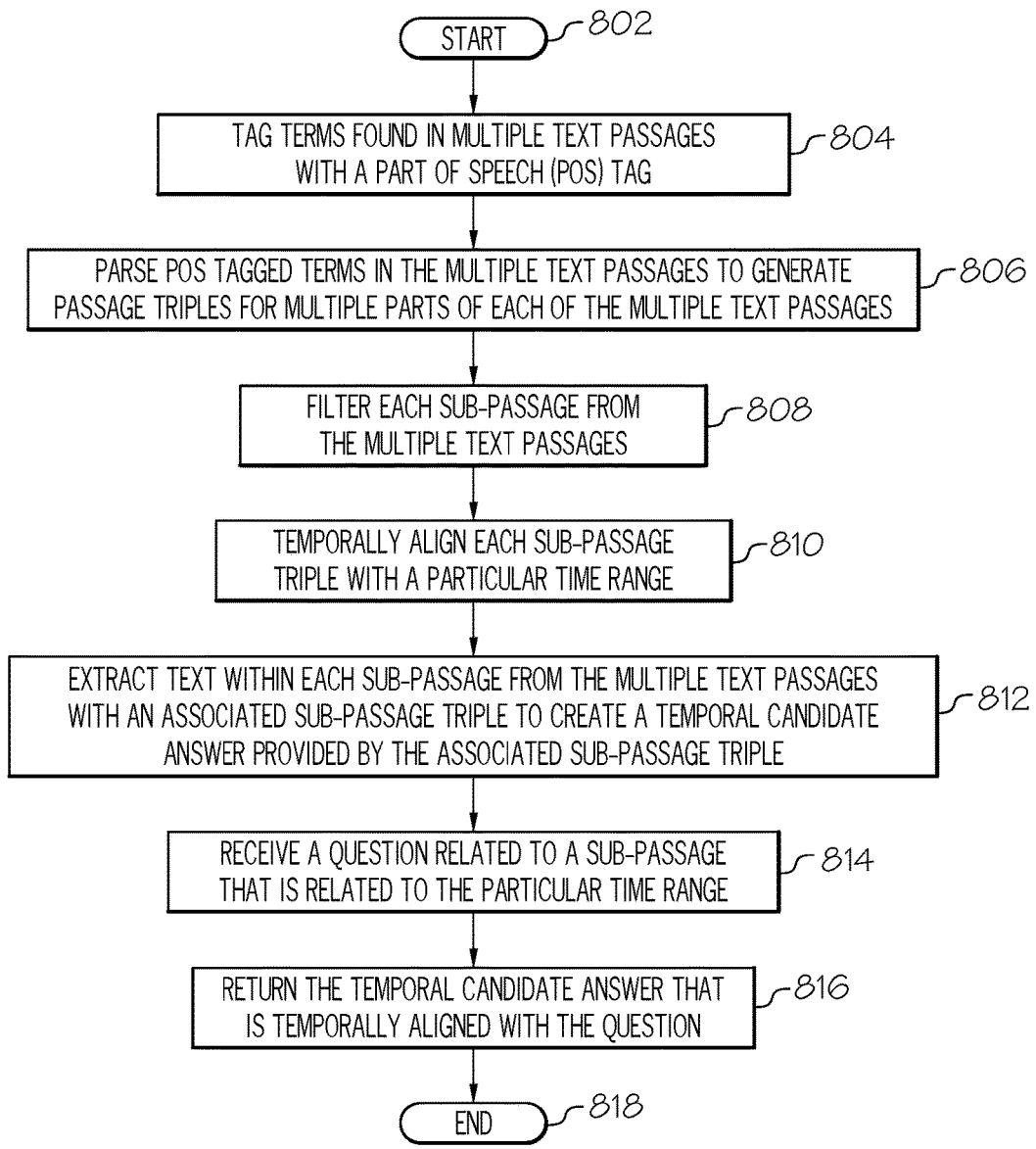
FIG. 8 is a high-level flow chart of one or more steps performed by one or more processors to generate candidate answers to a question.

With reference now to FIG. 8, a high-level flow chart of one or more steps performed by one or more processors to generate candidate answers to a question is presented.

After initiator block 802, one or more processors (e.g., processor 103 shown in FIG. 1) tags terms found in multiple text passages with a part of speech (POS) tag, as described in block 804. That is, each term/word in passage 306a is tagged with the part of speech (POS) to which it belongs. For example, in passage 306a "The" would be tagged with the POS tag "article", "third" would be tagged with the POS tag "adjective", "president" would be tagged with the POS tag "noun", "was" would be tagged with the POS tag "verb", "Person A" would be tagged with the POS formal noun, etc.

As depicted in block 806, one or more processors then parse POS tagged terms found in the multiple text passages to generate passage triples for multiple parts of each of the multiple text passages. For example, for the part (sub-passage) "The current president is Person B elected in March 2012." Shown in passage 306a, a sub-passage entity would be entity 307b, a sub-passage action would be action 309b, and a sub-passage date would be timestamp 311b. Thus, each sub-passage entity identifies an entity in each sub-passage, each sub-passage action describes an action being performed by the entity in each sub-passage, and each sub-passage date defines a time range during which an action was performed by the entity in each sub-passage. Thus, the sub-passage entity, the sub-passage action, and the sub-passage date make up a sub-passage triple.

As described in block 808, one or more processors filter each sub-passage from the multiple text passages by removing passages from each of the multiple text passages that are not associated with said each sub-passage. Thus, the passage "The bicameral parliament consists of the national assembly, which has 120 seats, and the Senate, which has 100 seats and was reinstituted in 2007" would be filtered out of passage 306a, since it is unrelated to the passage "The current president is Person B, elected in March 2012."

As described in block 810, one or more processors temporally align each sub-passage triple with a particular time range (e.g., align each passage with a certain range of dates).

As described in block 812, one or more processors extract text within each sub-passage from the multiple text passages with an associated sub-passage triple to create a temporal candidate answer provided by the associated sub-passage triple. For example, the text "The current president is Person B, elected in March 2012" is extracted from passage 306a shown in FIG. 3 and associated with triple 308b as a temporal candidate answer for query 302.

As described in block 814, one or more processors receive a question (e.g., query 302) related to a sub-passage that is related to the particular time range.

As described in block 816, one or more processors return the temporal candidate answer that is temporally aligned with the question.

The flow-chart ends at terminator block 818.

In an embodiment of the present invention, one or more processors weight the temporal candidate answer higher than any other candidate answer from the multiple text passages. That is, consider triple 308b shown in FIG. 3. Since the focus of the search is on the time parameter, then timestamp 311b is weighted higher than entity 307b or action 309b when generating the temporal answer score of 0.9 for triple 308b. In a further embodiment, timestamp 311b is weighted higher than entity 307b and action 309b combined when generating the temporal answer score, such that the timestamp 311b outweighs all other components of the triple 308b.

In an embodiment of the present invention, one or more processors semantically match the temporal candidate answer to the question in order to temporally align the temporal candidate answer to the question. That is, determining how closely aligned (temporally) the question and answers are is determined by the semantic meaning of the words within the question and candidate answers.

In an embodiment of the present invention, one or more processors stem word match the temporal candidate answer to the question in order to temporally align the temporal candidate answer to the question. That is, if the terms from the question and candidate answer are "New Year" and "New Year's Eve", then they share a same stem word ("New Year"), and are temporally aligned.

In an embodiment of the present invention, one or more processors synonym match the temporal candidate answer to the question in order to temporally align the temporal candidate answer to the question. For example, if the question asks about "Veteran's Day" and the temporal candidate answer references "Armistice Day", these both refer to November 11, and thus are closely related (if not actual synonyms to one another).

In an embodiment of the present invention, one or more processors apply a lexical answer type analysis of each of the sub-passages in order to define an event that each sub-passage describes, such that the lexical answer type analysis identifies the sub-passage entity as a person.

In an embodiment of the present invention, one or more processors apply a lexical answer type analysis of each of the sub-passages in order to define an event that each sub-passage describes, such that the lexical answer type analysis identifies the sub-passage entity as a place.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
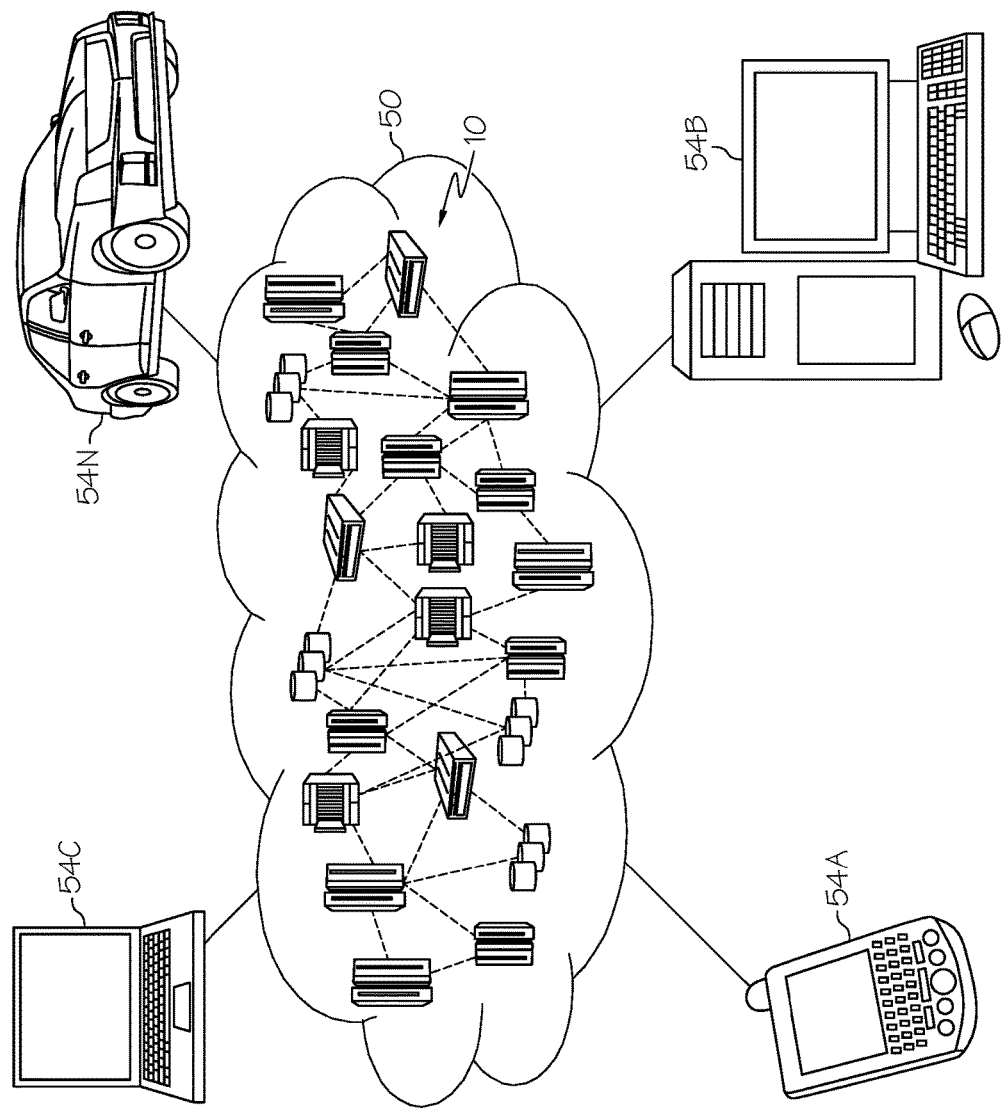
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
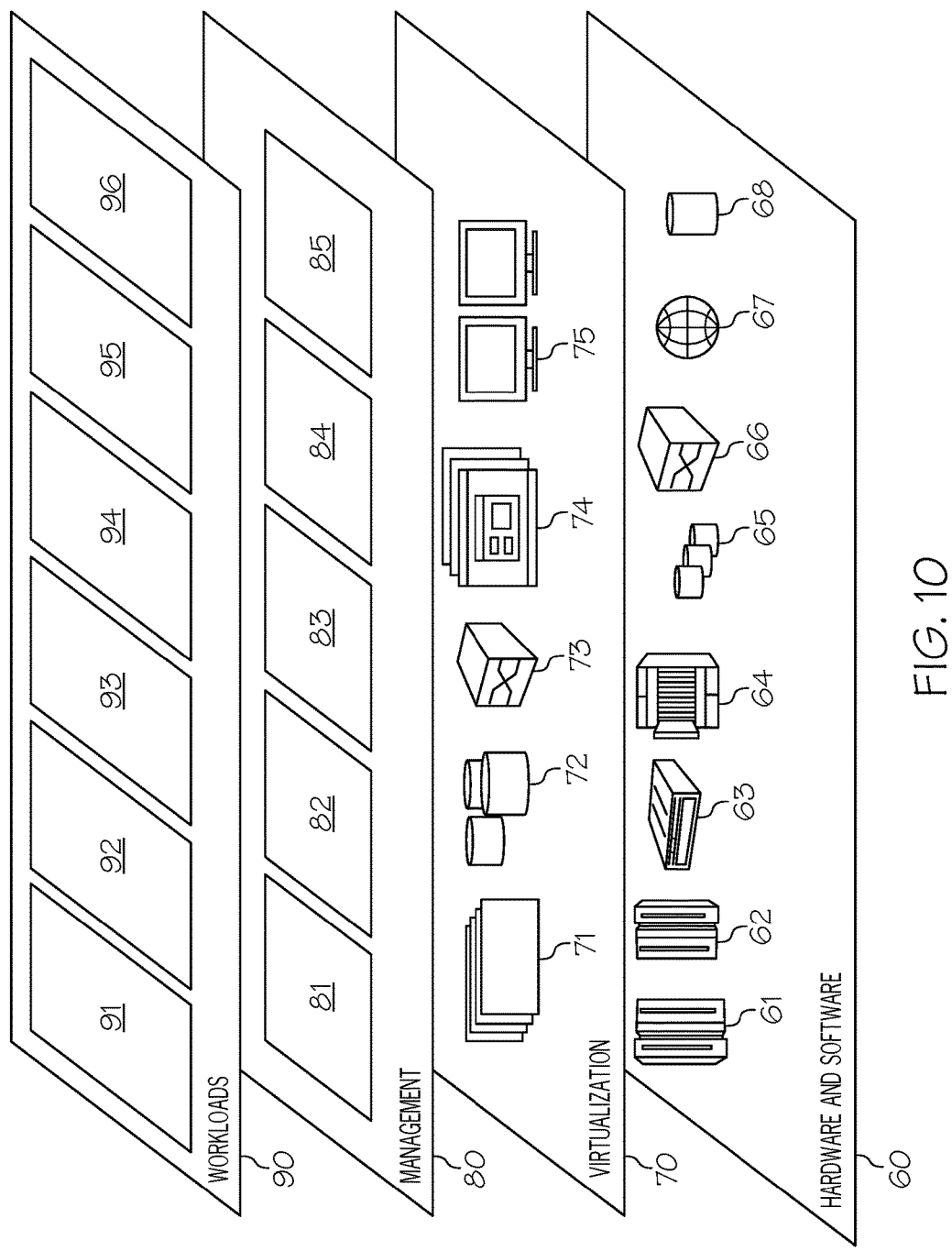
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ranking and retrieving answer sources processing 96 to rank and retrieve answer sources for temporal based questions in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   parsing, by one or more processors, a question to identify a lexical answer type for the question, a question action for the question, and a question timestamp for the question, wherein the lexical answer type indicates what entity type is being asked for by the question, wherein the question action describes an action referenced in the question that was performed by an entity of the entity type, wherein the question timestamp defines a time range during which the action referenced in the question was performed by the entity, and wherein the lexical answer type, the question action, and the question timestamp make up a question triple;
   retrieving, by one or more processors, multiple candidate passages for answering the question;
   parsing, by one or more processors, each of the multiple candidate passages to identify a candidate entity, a candidate action, and a candidate timestamp from each of the multiple candidate passages;
   generating, by one or more processors, a candidate answer triple from the candidate entity, the candidate action, and the candidate timestamp identified from each of the multiple candidate passages;
   comparing, by one or more processors, the question triple to the candidate answer triple generated from each of the multiple candidate passages, wherein the entity type in the question triple is compared to the candidate entity in the candidate answer triple, wherein the question action in the question triple is compared to the candidate action in the candidate answer triple, and wherein the question timestamp in the question triple is compared to the candidate timestamp in the candidate answer triple;
   establishing, by one or more processors, a match score for each candidate answer triple being compared to the question triple, wherein the match score is based on how closely the question triple matches a particular candidate answer triple;
   tagging, by one or more processors, the match score to each corresponding candidate answer triple generated from the multiple candidate passages; and
   associating, by one or more processors, the match score for each corresponding candidate answer triple with a corresponding candidate passage that generated the corresponding candidate answer triple for use in retrieving information used to answer the question.

2. The computer-implemented method of claim 1, wherein the match score for each candidate answer triple is established by semantically matching each candidate answer triple to the question triple.

3. The computer-implemented method of claim 1, wherein the match score for each candidate answer triple is established by stem word matching each candidate answer triple to the question triple.

4. The computer-implemented method of claim 1, wherein the match score for each candidate answer triple is established by synonym matching each candidate answer triple to the question triple.

5. The computer-implemented method of claim 1, wherein the lexical answer type defines an event that the question is asking about.

6. The computer-implemented method of claim 1, wherein the lexical answer type defines a person that the question is asking about.

7. The computer-implemented method of claim 1, wherein the lexical answer type defines a place that the question is asking about.

8. A computer program product comprising one or more computer readable storage mediums, and program instructions stored on at least one of the one or more storage mediums, the stored program instructions comprising:
   program instructions to parse a question to identify a lexical answer type for the question, a question action for the question, and a question timestamp for the question, wherein the lexical answer type indicates what entity type is being asked for by the question, wherein the question action describes an action referenced in the question that was performed by an entity of the entity type, wherein the question timestamp defines a time range during which the action referenced in the question was performed by the entity, and wherein the lexical answer type, the question action, and the question timestamp make up a question triple;
   program instructions to retrieve multiple candidate passages for answering the question;
   program instructions to parse each of the multiple candidate passages to identify a candidate entity, a candidate action, and a candidate timestamp from each of the multiple candidate passages;
   program instructions to generate a candidate answer triple from the candidate entity, the candidate action, and the candidate timestamp identified from each of the multiple candidate passages;
   program instructions to compare the question triple to the candidate answer triple generated from each of the multiple candidate passages, wherein the entity type in the question triple is compared to the candidate entity in the candidate answer triple, wherein the question action in the question triple is compared to the candidate action in the candidate answer triple, and wherein the question timestamp in the question triple is compared to the candidate timestamp in the candidate answer triple;

program instructions to establish a match score for each candidate answer triple being compared to the question triple, wherein the match score is based on how closely the question triple matches a particular candidate answer triple;

program instructions to tag the match score to each corresponding candidate answer triple generated from the multiple candidate passages; and program instructions to associate the match score for each corresponding candidate answer triple with a corresponding candidate passage that generated the corresponding candidate answer triple for use in retrieving information used to answer the question.

9. The computer program product of claim 8, wherein the match score for each candidate answer triple is established by semantically matching each candidate answer triple to the question triple.

10. The computer program product of claim 8, wherein the match score for each candidate answer triple is established by stem word matching each candidate answer triple to the question triple.

11. The computer program product of claim 8, wherein the match score for each candidate answer triple is established by synonym matching each candidate answer triple to the question triple.

12. The computer program product of claim 8, wherein the lexical answer type defines an event that the question is asking about.

13. The computer program product of claim 8, wherein the lexical answer type defines a person that the question is asking about.

14. The computer program product of claim 8, wherein the lexical answer type defines a place that the question is asking about.

15. The computer program product of claim 8, wherein the program instructions are provided as a service in a cloud environment.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to parse a question to identify a lexical answer type for the question, a question action for the question, and a question timestamp for the question, wherein the lexical answer type indicates what entity type is being asked for by the question, wherein the question action describes an action referenced in the question that was performed by an entity of the entity type, wherein the question timestamp defines a time range during which the action referenced in the question was performed by the entity, and wherein the lexical answer type, the question action, and the question timestamp make up a question triple;

program instructions to retrieve multiple candidate passages for answering the question;

program instructions to parse each of the multiple candidate passages to identify a candidate entity, a candidate action, and a candidate timestamp from each of the multiple candidate passages;

program instructions to generate a candidate answer triple from the candidate entity, the candidate action, and the candidate timestamp identified from each of the multiple candidate passages;

program instructions to compare the question triple to the candidate answer triple generated from each of the multiple candidate passages, wherein the entity type in the question triple is compared to the candidate entity in the candidate answer triple, wherein the question action in the question triple is compared to the candidate action in the candidate answer triple, and wherein the question timestamp in the question triple is compared to the candidate timestamp in the candidate answer triple;

program instructions to establish a match score for each candidate answer triple being compared to the question triple, wherein the match score is based on how closely the question triple matches a particular candidate answer triple;

program instructions to tag the match score to each corresponding candidate answer triple generated from the multiple candidate passages; and program instructions to associate the match score for each corresponding candidate answer triple with a corresponding candidate passage that generated the corresponding candidate answer triple for use in retrieving information used to answer the question.

17. The computer system of claim 16, wherein the match score for each candidate answer triple is established by semantically matching each candidate answer triple to the question triple.

18. The computer system of claim 16, wherein the match score for each candidate answer triple is established by stem word matching each candidate answer triple to the question triple.

19. The computer system of claim 16, wherein the match score for each candidate answer triple is established by synonym matching each candidate answer triple to the question triple.

20. The computer system of claim 16, wherein the lexical answer type defines an event that the question is asking about.

* * * * *